(12) United States Patent
    Porter et al.

(10) Patent No.: US 10,071,522 B2
(45) Date of Patent: *Sep. 11, 2018

(54) ROOF DITCH MOLDING PROCESS INCORPORATING CONFORMED SHAPING FEATURES IN A MOLDING FIXTURE

(71) Applicant: U.S. Farathane Corporation, Auburn Hills, MI (US)

(72) Inventors: Steve Porter, Romeo, MI (US); Gerald N. Strich, North Branch, MI (US)

(73) Assignee: U.S. Farathane Corporation, Auburn Hills, MI (US)

(*) Notice: Subject to any disclaimer, the term of this patent is extended or adjusted under 35 U.S.C. 154(b) by 689 days.

This patent is subject to a terminal disclaimer.

(21) Appl. No.: 14/596,828

(22) Filed: Jan. 14, 2015

(65) Prior Publication Data

US 2015/0123315 A1    May 7, 2015

Related U.S. Application Data

(63) Continuation-in-part of application No. 14/075,654, filed on Nov. 8, 2013, now Pat. No. 8,955,896, which
(Continued)

(51) Int. Cl.
   *B29C 51/08*    (2006.01)
   *B60R 13/04*   (2006.01)
   (Continued)

(52) U.S. Cl.
   CPC .......... *B29C 51/082* (2013.01); *B29C 47/003* (2013.01); *B29C 47/0019* (2013.01);
   (Continued)

(58) Field of Classification Search
   CPC . B29C 47/904; B29C 47/0059; B29C 51/082; B29C 67/0044; B29C 35/16
   See application file for complete search history.

(56) References Cited

U.S. PATENT DOCUMENTS 3,490,113 A    1/1970  Bulck
4,411,613 A *  10/1983 Gauchel ............... B29C 47/903
                                                  264/560

(Continued)

FOREIGN PATENT DOCUMENTS

EP       386986 A1    9/1990
EP      0430409 A2    6/1991
(Continued)

*Primary Examiner* — Galen H Hauth
(74) *Attorney, Agent, or Firm* — Dinsmore & Shohl LLP

(57) ABSTRACT

An assembly for reshaping an elongated plasticized article includes a heated fixture upon which the elongated article is supported in adhering fashion to a contoured upper surface. Following heating, the article is transferred to a cooling fixture exhibiting a further contoured upper surface and, upon subsequent cooling, the article exhibits a final multi-dimensional extending profile matching the contoured upper surface of the cooling fixture. A further variation of the assembly includes an elongated and bowed track supporting a fixed jig at an end thereof. A slidable jig is traversable along the track and actuated by a ram in directions towards and away from the first jig. Upon a first length extending portion of the article being pre-secured to the slidable jig, a first forward feed direction of the article results in an end extending portion communicating within a multi-dimensional cavity establishing a contoured surface withing the fixed jig, subsequent rearward displacement of the slidable jig causes forcible reshaping of the elongated article as it is stretched and drawn against the contoured surface of the fixed jig.

12 Claims, 13 Drawing Sheets

Related U.S. Application Data is a continuation-in-part of application No. 13/794,073, filed on Mar. 11, 2013, now Pat. No. 8,783,751.

(60) Provisional application No. 61/976,894, filed on Apr. 8, 2014, provisional application No. 61/669,732, filed on Jul. 10, 2012.

(51) Int. Cl.
*B29C 47/00* (2006.01)
*B29C 47/04* (2006.01)
*B29C 47/88* (2006.01)
*B29C 47/90* (2006.01)
*B29C 51/18* (2006.01)
*B29K 101/12* (2006.01)
*B29L 31/00* (2006.01)

(52) U.S. Cl.
CPC ...... *B29C 47/0054* (2013.01); *B29C 47/0059* (2013.01); *B29C 47/04* (2013.01); *B29C 47/8805* (2013.01); *B29C 47/90* (2013.01); *B29C 47/904* (2013.01); *B29C 47/908* (2013.01); *B60R 13/04* (2013.01); *B29C 47/0035* (2013.01); *B29C 47/0066* (2013.01); *B29C 51/18* (2013.01); *B29K 2101/12* (2013.01); *B29L 2031/001* (2013.01)

(56) References Cited

U.S. PATENT DOCUMENTS

| | | | |
|---|---|---|---|
| 5,013,083 A | 5/1991 | Yada et al. | |
| 5,026,477 A * | 6/1991 | Yen | A01K 63/04 119/231 |
| 5,069,853 A | 12/1991 | Miller | |
| 5,108,681 A | 4/1992 | Cakmakci | |
| 5,167,891 A | 12/1992 | Dijkman, Sr. et al. | |
| 5,199,292 A | 4/1993 | Del Fabro et al. | |
| 5,205,885 A * | 4/1993 | Schutz | B29C 31/002 156/245 |
| 5,368,903 A | 11/1994 | Trier | |
| 5,424,023 A | 6/1995 | Riley et al. | |
| 5,429,777 A * | 7/1995 | Nilsson | B29C 33/02 264/235 |
| 6,210,615 B1 | 4/2001 | Yoshizuru et al. | |
| 6,224,145 B1 | 5/2001 | Sugiura | |
| 6,510,602 B2 | 1/2003 | Sugiura | |
| 6,684,574 B2 | 2/2004 | Hayashi | |
| 6,974,181 B2 | 12/2005 | Mikkaichi et al. | |
| 7,004,535 B1 | 2/2006 | Osterberg et al. | |
| 7,004,537 B2 | 2/2006 | Unger et al. | |
| 7,022,279 B2 * | 4/2006 | Taillieu | B29C 35/0288 264/211.12 |
| 7,029,060 B1 | 4/2006 | Osterberg et al. | |
| 7,045,189 B2 | 5/2006 | Hui et al. | |
| 7,069,760 B2 | 7/2006 | Jin | |
| 7,201,571 B2 | 4/2007 | Graefe et al. | |
| 7,401,395 B2 | 7/2008 | Unger et al. | |
| 7,531,118 B2 | 5/2009 | Ellis | |
| 7,604,287 B2 | 10/2009 | Mourou | |
| 7,621,574 B2 | 11/2009 | Mourou et al. | |
| 7,695,670 B2 * | 4/2010 | Furuta | B29C 33/12 264/510 |
| 7,815,830 B2 | 10/2010 | Ohlberg et al. | |
| 7,837,257 B2 | 11/2010 | Kuntze et al. | |
| 8,070,204 B2 | 12/2011 | Mourou | |
| 8,333,858 B2 * | 12/2012 | Rubin | B29C 70/504 156/200 |
| 2004/0201126 A1 | 10/2004 | Jakoby et al. | |
| 2006/0052538 A1 | 3/2006 | Ellui et al. | |
| 2007/0170614 A1 | 7/2007 | Ohlberg et al. | |
| 2007/0182214 A1 | 8/2007 | Okabe et al. | |
| 2008/0277973 A1 | 11/2008 | Mourou | |
| 2009/0021053 A1 | 1/2009 | Harberts et al. | |
| 2009/0102241 A1 | 4/2009 | Harberts et al. | |
| 2010/0180536 A1 | 7/2010 | Reznar | |
| 2010/0196629 A1 | 8/2010 | Mourou et al. | |
| 2011/0010898 A1 | 1/2011 | Scroggie et al. | |
| 2011/0108667 A1 * | 5/2011 | Keller | B29C 51/082 244/119 |
| 2011/0204671 A1 | 8/2011 | Baratin | |
| 2012/0068488 A1 | 3/2012 | Mourou | |
| 2012/0321734 A1 | 12/2012 | Kenny et al. | |
| 2013/0020737 A1 | 1/2013 | Ulcej | |
| 2013/0037986 A1 | 2/2013 | Graf | |
| 2013/0152423 A1 * | 6/2013 | Wu | A43B 23/0235 36/45 |
| 2013/0234474 A1 | 9/2013 | Coakley et al. | |
| 2013/0255349 A1 | 10/2013 | Lee et al. | |
| 2014/0062117 A1 * | 3/2014 | Baxter | B60R 13/04 296/1.08 |

FOREIGN PATENT DOCUMENTS

| | | | |
|---|---|---|---|
| EP | 0857615 A1 | 8/1998 | |
| JP | 09150683 A | 6/1997 | |
| JP | 2003040042 A | 2/2003 | |
| JP | 2003182466 A | 7/2003 | |
| JP | 2007302171 A | 11/2007 | |
| JP | 2010501384 A | 1/2010 | |
| JP | 4722765 B2 | 7/2011 | |

* cited by examiner

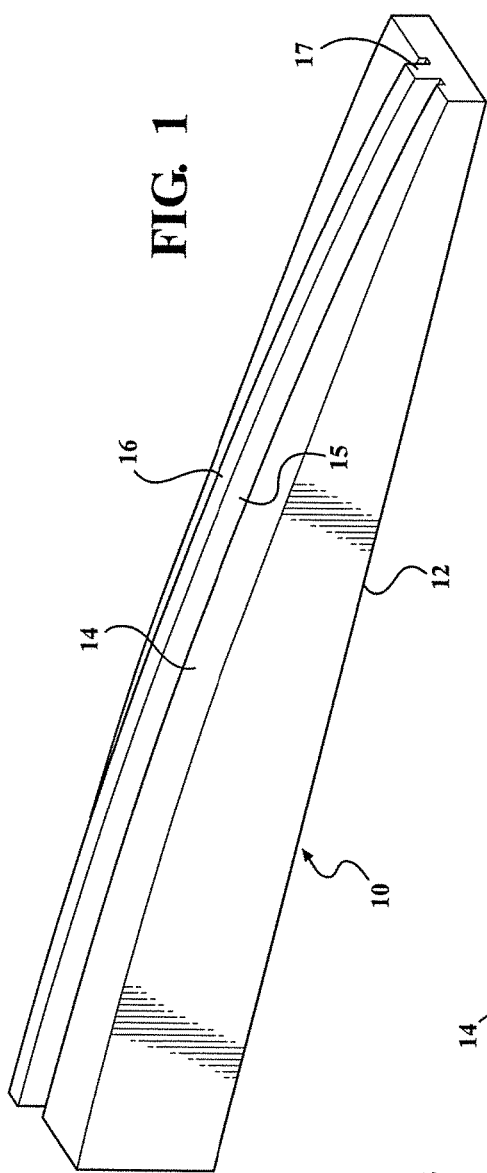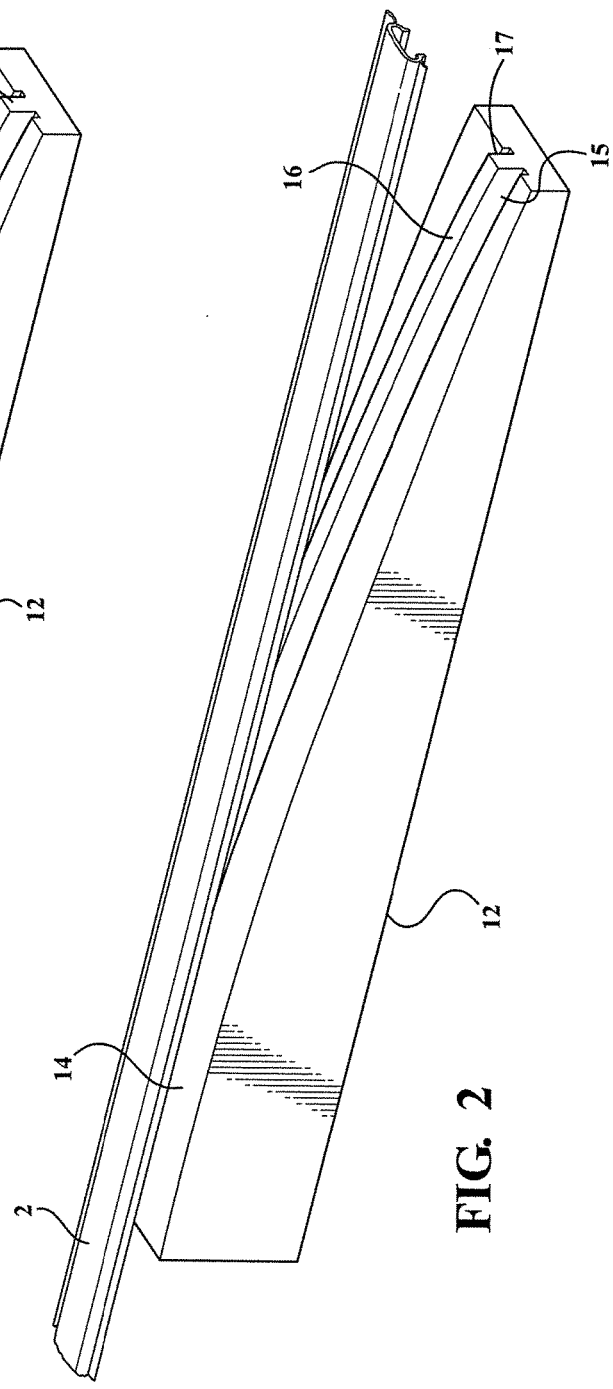

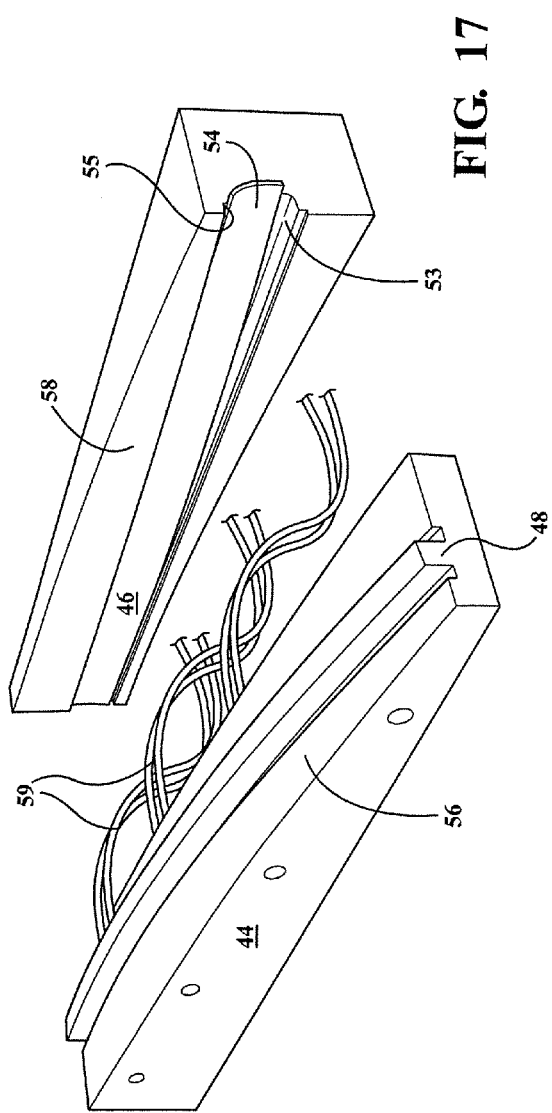
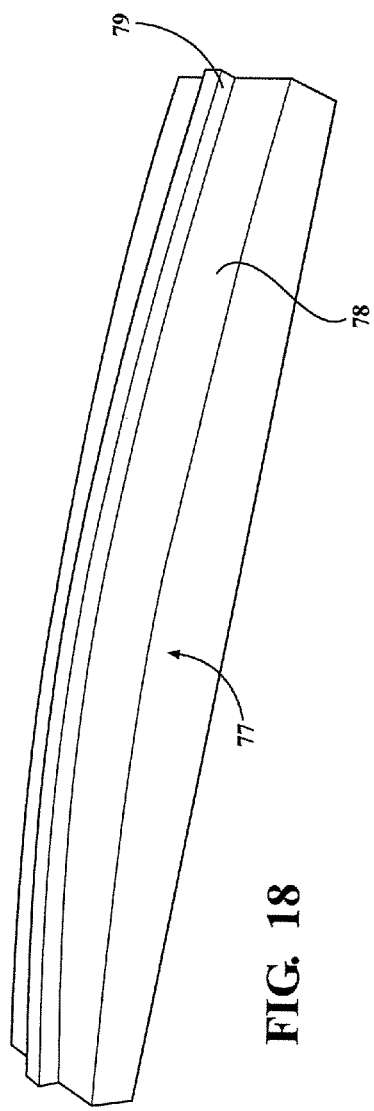
FIG. 17
FIG. 18

ROOF DITCH MOLDING PROCESS INCORPORATING CONFORMED SHAPING FEATURES IN A MOLDING FIXTURE

CROSS-REFERENCE TO RELATED APPLICATIONS

This application claims the benefit of U.S. Provisional Application 61/976,894 filed on Apr. 8, 2014. This application is a Continuation-in-part of application Ser. No. 14/075,654 filed on Nov. 8, 2013. Application Ser. No. 14/075,654 is a Continuation-in-part of application Ser. No. 13/794,073 filed on Mar. 11, 2013. Application Ser. No. 13/794,073 claims the benefit of U.S. Provisional Application 61/669,732 filed on Jul. 10, 2012, the contents of which are incorporated herein in their entirety.

FIELD OF THE INVENTION

The present inventions disclose both an assembly and process for assisting in final shaping an elongated, typically pre-extruded, article which in one non-limiting instance is provided as an extending roof ditch molding. More specifically disclosed is any of one or more components directed to the above objectives and which includes at least a heated main bending fixture exhibiting a contoured and supporting surface against or within which the elongated article is clamped or otherwise adhered prior to being reshaped or bent by the application of heat in at least a conductive fashion by the fixture.

An optional pre-heat station can be provided for heating such as intermediate sections of the previously extruded or otherwise formed plastic article (such further interpreted to include any single component extrusion or multi-component extrusion, the latter of which can exhibit components of varying plasticized composition and durometer ratings). Pre-heating of the intermediate sections can further be localized to regions short of the opposite ends, this in order to facilitate ease of operator handling as well as subsequent clipping to exact length of the finished bent article.

In one non-limiting application, pluralities of grippers or other portions can be incorporated into the main fixture in proximity to the contoured or otherwise configured surfaces (typically engaging underside locations) for holding the article against the (usually lower) forming surface during heating/bending. Additional to conductive heating of the part during the final shaping operation (such optionally including the provision of an upper clamping die in combination with a mating lower die defining a part seating channel recess therebetween). The present invention also contemplates additional convective heating, such as including the provision of a heated airflow lengthwise through the channel recess, this in order to further assist in heated reforming of the part.

Following reshaping, the plasticized article is transferred to a like configured cooling fixture for assisting in the setting and hardening of the article. As part of this step, cooling air can be provided to assist in even establishing an even finishing and shaping of the finish formed article.

Following cooling of the (now final shaped) part using ambient or cold forced air, any excess length of the finished product can be shortened by clipping the ends, such including the provision of knife end incising sub-assemblies built into the main bending fixture and which are aligned with desired end-points of the bent article which correspond to a desired overall length dimension. Incising or trimming end portions of the completed bent elongated article reflects the reality that the preceding bending and heating/cooling steps can impart variations to the overall length of the finished product, and which are best addressed by providing the initially formed extrusion at a slightly longer dimension and by simply clipping off any excess end materials associated with the completed bent article.

Additional features include the upper clamping die being provides as a top or cap fixture, such being affixed over a lower or base supporting fixture. The top and bottom fixtures exhibit aligning channels (typically arcuate in shape) which align upon closing the die halves in order to define the cavity with the pre-formed part capture therebetween. The cooling fixture can also include a likewise similarly configured top cavity.

A further variant can include first and second jigs or fixtures, a first of the fixtures being displaceable along a supporting track in directions towards or away from the other fixture which is fixed. The elongated article is affixed to the slidable fixture and fed, in an inserting direction, through a seating cavity or channel defined in the fixed fixture.

The article gripping or receiving surfaces of either fixture can be further configured to facilitate a desired bending profile associated with the elongated article. A reconfigured gripper can be located at a reverse end projecting location of the fixed fixture and which is manipulated to grasp a projecting tip of the elongate fed article which, upon subsequent retraction of the sliding fixture causes a stretching of the article against the fixture to assist in locking in the memory of the deformed shape.

BACKGROUND OF THE INVENTION

The prior art is documented with examples of forming and shaping assemblies, such as in use with extruded or other pre-formed parts. A first example of this is depicted in Lee US 2013/0255349 which teaches a bending press system including at least one guide post. A slide plate is mounted at a slider so as to be slidable upwardly or downwardly along the guide post. A bending die including a lower die having an upper surface and an upper die having a lower surface corresponding to the upper surface of the lower die and mounted on a lower surface of the slide plate, and adapted to bend an object supplied between the lower die and the upper die to have a predetermined curvature; and a pair of clamping means mounted respectively at both sides of the bending die corresponding to the bending die and adapted to clamp both end portions of the object.

Riley, U.S. Pat. No. 5,424,023, teaches an apparatus and method for forming curved extruded products and which includes an extrusion apparatus, a method of making a curved extrusion, and a curved extrusion made by the method. The apparatus includes an extruder adapted to produce an extruded material having a cross-section. A plurality of guide members are arranged so as to form a curvilinear path through which the extrusion is passed, each of the guide members having an aperture having substantially the same shape as the cross-section of the extrusion. The plurality of guide members are adapted to form the extrusion into a curved shape, while maintaining the cross-section of the extrusion. A mechanical means is adapted to conduct the extrusion through the plurality of guide members, such as an extrusion puller.

Del Fabro, U.S. Pat. No. 5,199,292, teaches an assembly for bending bundles or rods in a position normal to a supporting bench and in four directions so as to produce any desired closed figure. Retaining means including grippers are provided and move vertically in guides for retracting downwards and which are included upstream and downstream of the bending assembly on substantially the same axis as the bundle of rods.

Ohlberg, U.S. Pat. No. 7,815,830, teaches a method for extruding curved extruded profiles. The extruded profile is formed in a matrix mounted upstream in a counter beam of an extruder system and is subsequently curved or bent due to the effect of external forces and separated, supported and arranged into partial lengths in the extrusion flow by means of a separating robot connected to a higher control mechanism and is discharged to a storage area with the aid of a handling robot. The handling robot is coupled to the separating robot by means of the control mechanism and, like the separating robot, is moved into a starting position in front of the extrusion press.

Other references of note include the method and device for forming a curved extruded article of Jakoby, US 2004/0201126, as well as the heat formed thermoplastic vulcanizate (TPV) co-extruded header trim of Ellis, U.S. Pat. No. 7,531,118. Other additional references include each of the apparatus for making curved plastic shapes, U.S. Pat. No. 3,490,113, the roof molding for an automobile of Sugiura, U.S. Pat. No. 6,510,602 and the handling system for curved extrusions of EP 0 430 409.

SUMMARY OF THE INVENTION

The present invention discloses an assembly for reshaping an elongated plasticized article, such as which can be initially formed in an extruding operation. The assembly includes a heat-able fixture exhibiting a contoured upper surface including a channel or other lengthwise extending recess or trough for seating the elongated article in adhering fashion to the contoured upper surface.

A heated thermal input is conducted through the heat-able fixture in communication with at least one surface of the article for softening a given portion thereof. A separate cooling fixture exhibits an approximate contoured upper surface, compared to that exhibited by the heat-able fixture, and to which the article is transferred following delivery of the heated thermal input. Upon subsequent cooling, the (finally reshaped) article exhibits an extending profile matching the contoured upper surface.

Additional features include either of the heat-able or cooling fixtures further including first and second spaced apart fixtures adapted to supporting extending ends of an elongated article. Other features include the provision of a pre-heat station for pre-softening at least an extending subset portion of the article prior to transfer to the heating fixture.

Pluralities of gripping fingers are arranged in communication with an underside of the contoured upper surface of the heat-able fixture and, in the instance of a lower supporting fixture, are adapted to engage at least underside accessible cross sectional profile locations of the article. Other features include at least one top heat-able or cooling fixture supported in compressing fashion against the contoured upper surface of either or both of each of the article supporting heating or cooling fixtures, the elongated article sandwiched between the fixtures.

The sandwiching fixtures define an extending cavity within which is seated the article. The top cooling fixture can further exhibit an airflow passageway for communicating a cooling airflow in a direction towards an upper surface of the article. Following finished shaping of the article, an end actuating knife can be employed for sectioning any excess length of the article.

A further variant of the assembly for reshaping an elongated plasticized article includes an elongated track supporting a fixed jig at an end thereof. A slidable jig is traversable along the track and actuated by a ram in directions towards and away from the first jig. Upon a first length extending portion of the article being pre-secured to the slidable jig, an end extending portion of the article is communicated with a cavity associated with the fixed jig, subsequent forward displacement of the slidable jig force feeding a second length extending portion of the article through a cavity associated with the fixed jig and in order to assist in final reshapening of the article.

Other features include a clamp positioned at a reverse end of the fixed jig for engaging a projecting tip of the force fed article, this preceding a reverse actuation of the sliding fixture by the ram in order to draw down the article against a surface profile associated with the extending cavity and to assist in bending according to the desired profile. As with the preceding embodiment, a heated thermal input can be incorporated into at least one of the fixed or slidable jigs.

BRIEF DESCRIPTION OF THE DRAWINGS

Reference will now be made to the attached drawings, when read in combination with the following detailed descriptions, wherein like reference numerals refer to like parts throughout the several views, and in which:

FIG. 1 is an illustration of a portion or end supporting wing of a heated and elongated part supporting fixture according to one non-limiting variant of the present invention, the fixture including a contoured upper surface against which a previously formed (e.g. extruded or other) elongate plastic article is held during bending re-forming into a desired completed three dimensional profile;

FIG. 2 is an illustration of a previously extruded and (initially) straight elongated article being introduced upon the forming fixture of FIG. 1, with or without the ends of the plastic article having been preheated;

FIG. 9 again illustrates the main fixture individually, as substantially previously shown in FIG. 7, and in order to assist in heated reshaping of the elongate article captured there between;

FIG. 17 is a further illustration in perspective of the top and bottom fixtures of FIG. 15 and better illustrating one non-limiting example of the resistive elements for conductive heating of at least the bottom fixture;

FIG. 18 is an illustration of a similarly configured cooling block or fixture, such as which approximates the surface configured profile of the main heating fixture, and to which the elongated part can be transferred during a subsequent cooling/setting stage;

DETAILED DESCRIPTION OF THE PREFERRED EMBODIMENTS

Figure 2A:
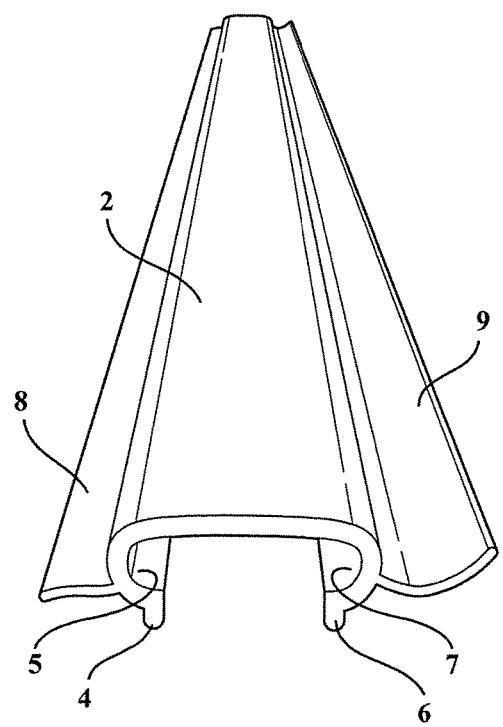
FIG. 2A is an illustration of an end perspective of a non-limiting configuration of part profile of elongated extrusion, such as associated with a roof ditch style molding application.

With reference to the following description and illustrations, the present inventions disclose both an assembly and process for assisting in final shaping a previously formed and elongated plasticized article. Without limitation, such articles can include previously extruded plastic material, such as for subsequent use in a roof ditch molding in which the elongated article (part) must first be finally reshaped into a final multi-dimensional profile, in order that it can be affixed within a recessed track, channel or other profile (not shown) associated with a roof of the vehicle and in order to provide a desired decorative finish.

More specifically disclosed is any of one or more components directed to the above objectives and, among these including an optional pre-heat station for heating such as intermediate sections of the previously extruded article, further interpreted to include any single component extrusion or multi-component extrusion, the latter of which can exhibit components of varying plasticized composition and durometer ratings. As will be further described, an optional pre-heating of the intermediate sections can be performed, such as further being localized to regions short of the opposite ends, this in order to facilitate ease of operator handling as well as subsequent clipping to exact length of the finished bent article.

As will be further described, a main bending fixture is provided and, in specified variants, can include a single elongated fixture corresponding generally to the entire length of the elongated article (single or multi-component extrusion) to be formed. Alternatively, and as depicted in the present illustrations, the main fixture can be separated into a pair of end extending fixtures (also informally referred to as "wing" supporting fixtures) for forming corresponding end portions of an elongated and typically extruded article which supported in extending fashion upon the end located fixtures, such further including an intermediate (middle) extending portion of extrusion being supported in some fashion there between.

In any of the various embodiments, the main bending fixture exhibits a contoured surface against which the elongated article is clamped or otherwise drawn prior to being reshaped via the application of heat through the main bending fixtures. Without limitation, this can include the provision of heated resistance element for applying a primarily conductive heating profile to either or both a main bottom supporting fixture and, optionally, a top affixing fixture. The invention also envisions a further heating protocol in which the conductive heat profile which can be combined with an additional heated airflow which is communicated through an elongated inner channel defined between the mating top and bottom fixtures, within which the previously placed elongated plasticized article is supported in its desired final profile.

Following heating, the elongated article, or multiple articles depending upon the configuration of the bottom fixture, with or without optional top fixtures, is transferred to a like surface profile configured cooling fixture. The cooling fixture again includes a similar multi-dimensional profile exhibiting the desired multi-dimensional configuration of the finished product.

More particularly, the elongated article supporting profile associated with the cooling fixture can vary to some slight degree in comparison to the supporting profile exhibited by the heating fixture, this taking into account certain variances in the shaping and dimensioning of the elongate part after it is heated and initially reshaped, to which a degree of "spring back" will occur (further defined as the final shaping the part reverts to when cooled and as a variable of how its material properties respond to cooling) when the part is removed from the heating fixtures. It is also envisioned that such "spring-back" can occur after the cooling step as well. As a result, the cooling fixture may or may not match the final part shape and it is therefore understood that the present inventions contemplate that the shaping of the heating fixture support surface may (or may not) completely match the final desired shaping of the part (such as which is typical of the cooling block configuration), and further that some degree of "overbend" may have to be incorporated into the article gripping contours of heating fixtures in order to produce the final desired shape, and once the heated/molten part is transferred to the cooling block.

The cooling fixture can also be pre-chilled or maintained at ambient temperature for assisting in setting in the desired shape. Cooling or ambient airflows can be incorporated at this step (in a similar fashion as associated with the resistance heat or conductive heating profiles) for assisting in the cooling and setting of the elongated article in its desired final multi-dimensional configuration.

Following cooling of the (now shaped) part, any excess length of the finished product can be shortened by clipping the ends, such including the provision of knife end incising sub-assemblies built into the main bending fixture and which are aligned with desired end-points of the bent article which correspond to a desired overall length dimension. Incising or trimming end portions of the completed bent elongated article reflects the reality that the preceding bending and heating/cooling steps can impart variations to the overall length of the finished product, and which are best addressed by providing the initially formed extrusion at a slightly longer dimension and by simply clipping off any excess end materials associated with the completed bent article.

Proceeding from the above overview, and referring to the attached illustrations, FIG. 1 is an illustration generally at 10 of a first selected end or fixture (also termed wing fixture) according to one non-limiting configuration for supporting an elongated extruded or other suitable plasticized or composite constructed article, further depicted at 2 in FIG. 2-2A. An opposite or second end supporting fixture of similar configuration is also provided for supporting a second extending end of the elongated and pre-formed plasticized article and, as will be further described, the invention also contemplates any type of intermediate supporting fixture associated with the elongated article to be reshaped.

Without limitation, the arrangement and shape of the supporting/reshaping fixtures is dictated in part by the desired final shaping of the elongated article, and in particular to what degree the ends and intermediate extending locations of the article are to be reconfigured, such as in order to accommodate a given vehicle style. It is further understood that the material construction of the fixtures 10 can include any suitable heat conductive material such as an aluminum or other metal including any composite material which exhibits the desirable properties of heat conductivity associated with the plasticized article to be shaped.

The elongated or strip like article 2 can exhibit any configuration and which, as previously described, can incorporate any single or multiple material extrusion (e.g. co-extruded or tri-extruded article) and, in the non-limiting example shown, is provided as an elongated molding for installation in a vehicle roof ditch. Without limitation, the elongated article 2 can also be created by other forming technique, not limited to other plasticized drawing or injection molding processes.

The elongated strip as best shown in end perspective in FIG. 2A includes a typically decorative finished upper surface (again at 2) and with a modified underside accessible "C" channel including in part a pair of inwardly curled end portions 4 and 6 communicating with inwardly facing side recess locations 5 and 7, these facilitating gripping of the underside of the extrusion or other elongated article 2 as subsequently shown in FIG. 4, in addition to their putative application for providing an underside channel for seating mounting anchors associated with the normal roof ditch mounting application. The elongated article 2 also includes a pair of extending wings 8 and 9, these typically consisting of a softer durometer grade material in combination with a harder base durometer material forming the middle "C" channel configuration. Without limitation, the elongated article 2 can include additional materials (such as a third extruded slip coat) and it is envisioned that other plasticized based components, not limited to extrusions, can also be bent/reshaped using the method and assembly of the present invention.

As shown again in FIGS. 1-2 the exemplary end supporting fixture 10, in this instance again being a selected left or right side extrusion supporting fixture portion which, along with an identical opposite end located fixture portion (again not shown) is also provided, includes a base supporting underside or platform surface 12, which can be bolted or otherwise anchored to a ground or other table top surface. The fixture is typically constructed of a metal and also includes an arcuate upper surface 14, this also contemplating a single molded structure or any multiple of individual jig or fixture defining portions and which defines a generally elongated profile for the final shaping of the supported article over multiple dimensions.

As shown, the fixture 10 also depicts a multi-axial projecting and template defining projection or profile, having a top surface 16 bounded by projecting and interconnected side surfaces 15 and 17. The projection is depicted in end profile as a rectangular cross sectional shaped portion defined upon and extending along the arcuate upper surface 14, upon which the underside "C" channel of the elongated article 2 is supported so that the article 2 can be subsequently conformed in the succeeding reshaping operation.

It is understood that the template defining profile of the fixture 10, which is again established by the interconnecting surfaces 15, 16 and 17 of the projecting profile in combination with the three dimensional and sloping contour of the upper fixture surface 14, also slopes horizontally between first and second ends thereof as shown in FIG. 1. In this fashion, the elongated article can be conformed and subsequently mechanically reshaped to any desired multi-directional or multi-axial fashion, in order to facilitate the reshaping of an article 2 to the desired profile for mounting in the eventual use application (e.g. again such as a vehicle roof ditch in which the article mounts into an elongated ditch well which mimics the profile of the jig contoured surfaces).

As will also be described in reference to future variants, the elongated article or extrusion can include a pre-heating step, by which any extending portion thereof, not limited to the ends or intermediate end locations, are heated to facilitate the re-forming or shaping of any part or all of the extending length of the article. Such a pre-heating operation can be performed at a separate heating station prior to the elongated article being introduced upon the main bending fixture (FIG. 2). As further shown in FIG. 2, the (initially) straight extrusion can also introduced to the forming fixture 10, with at least an intermediate location thereof at ambient temperature and with the ends thereof optionally pre-heated to a desired temperature.

Figure 3:
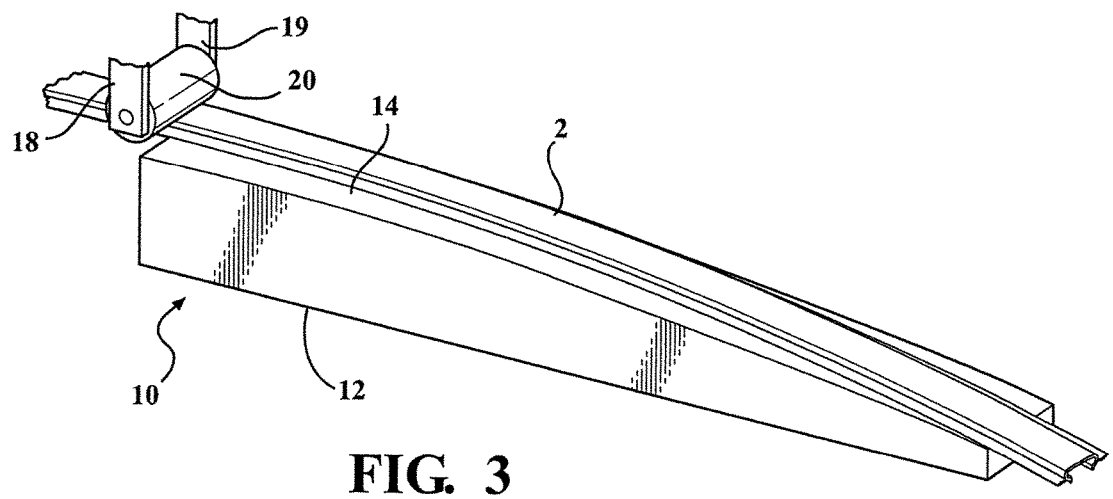
FIG. 3 is a succeeding illustration to FIG. 2 and showing the elongated plasticized article or extrusion in a conformed or bent condition upon a selected end supporting and forming fixture.

FIG. 3 is a succeeding illustration to FIG. 2 and showing the extrusion in a conformed or bent condition upon the forming fixture, such resulting from a combination of heat and mechanical force applied to the article into adhering contact with the contoured shaping of the extending profile (again interconnecting surfaces 15/16/17) associated with the top arcuate lengthwise extending surface 14 of the superstructure. In one application, the ends of the extrusion can be held down against the fixture via clamps (not shown).

Other possible variants for conforming the initially straight and pre-formed extrusion to the template surfaces of the fixtures can include incorporating a roller assembly, see as depicted in FIG. 3 by carriage supports 18 and 19 with intermediate extending roller 20. As shown, the roller 20 is driven by such as a numerically controlled piece of equipment (not shown) so that it is brought into progressive contact with the pre-placed elongated article 2 and subsequently traversing the supported length of the fixture 10 (over any desired number of iterations or passes) in order to flatten/reshape into adhering and seating contact with and along the upper seating profile 16 (again FIG. 2). Other options include other variations of rollers, pads or the like depending upon the contours (i.e. multi-axial bend or curvature) of the elongated article being reshaped. As will also be described in further detail, other options include stretching the elongated article 2 during heating, such as either a fixed distance or according to a given fixture supporting profile which it is desired to conform the article to.

Figure 4:
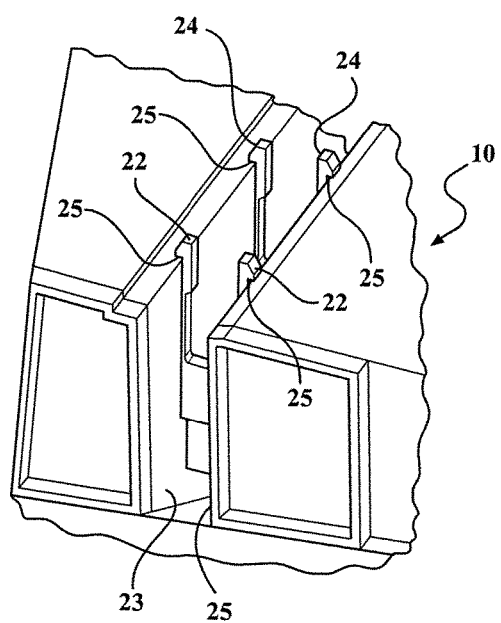
FIG. 4 is an underside illustration of a forming fixture such as depicted in FIGS. 1-3 and illustrating a plurality of gripping fingers which are configured to grip recessed underside accessible contours associated with the previously extruded article and to assist in conforming the article to the guiding/conforming upper surface of the fixture.

Proceeding to FIG. 4, an underside illustration is shown of a selected forming fixture, such as previously depicted at 10, and illustrating a plurality of gripping fingers 22 and 24 integrated into the channel defining or seating profile 16, the gripping fingers being configured to project through selected aperture locations (see side walls 23 and 25) at locations along the length of the profile 16, and in order to grip recessed underside accessible contours associated with the previously extruded article 2 (see again "C" channel defined ends 4 and 6 with inner recess communication locations 5 and 7) and to assist in conforming the article to the cross dimension projection (surfaces 15/16/17) and guiding/conforming upper surface 14 of the fixture 10. As further shown, the gripping fingers can be configured in a number of different ways and can exhibit any shape or profile associated with the either of inner or (as shown) outwardly facing gripping ledges 25 for engaging opposing ledge defined locations of the part, such also including the ability to be retracted following forming of the part profile to facilitate removal and reloading of a further article 2 (see again FIG. 2) in a repeating cycle.

Figure 5:
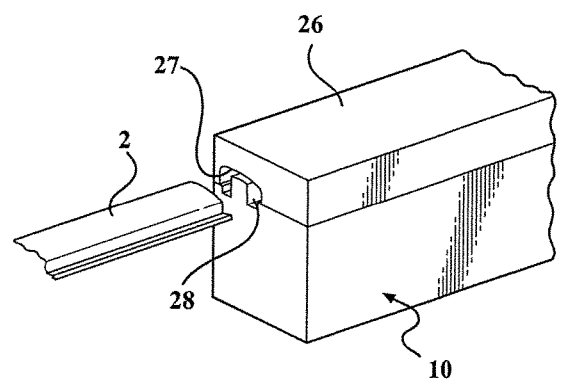
FIG. 5 is an example of a top attached fixture with underside defining cavity which can be affixed over the conforming surface of the main forming fixture in aligned and seating fashion such that the sandwiched extrusion is both guided and compressed into its end configured shape.

Referring to FIG. 5 a top attached fixture 26 is depicted in secured fashion over a selected lower or main fixture 10 and such that the top fixture 26 is seated over the upper supporting surface 14 of the lower fixture 10. The top fixture 26 defines an underside surface, see at 27, which mates with the top surface of the fixture portion 14 and collectively exhibits an underside defining cavity, see further at 28. In this fashion, the top fixture can be affixed over the conforming surface of the main forming fixture in aligned and seating fashion, further such that the elongated article 2 is both guided and compressed between the fixtures 10 and 26 into its end configured shape. The present invention also contemplates additional variants in which the article 2 can be pre-positioned, such as via the engaging fingers 22 and 24 or some variation thereof, following which the top cap or fixture 26 is optionally installed.

Figure 6:
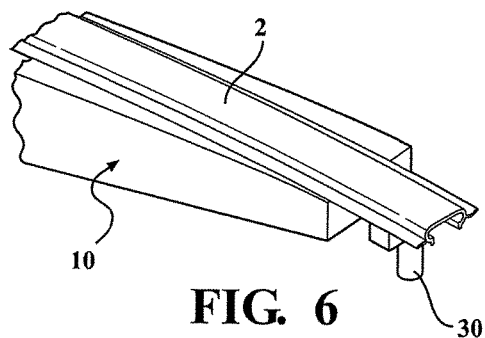
FIG. 6 is an upper perspective illustration of a fixture incorporating grippers such as shown in FIG. 4 for holding down such as the ends of the part against the fixture.

Proceeding to FIG. 6, presented is an illustration similar to that shown in FIG. 3 and exhibiting an end proximate located gripper 30 for securing an overhanging or projecting end portion of the elongated article 2 supported upon the fixture 10 and for forcing the article against the fixture in one further non-limiting application. Consistent with the previous description of the grippers 22 in FIG. 4, it is understood that the upward extending engaging fingers associated with the end gripper 30 (largely hidden underneath the extrusion 2) can be similarly configured.

Figure 7:
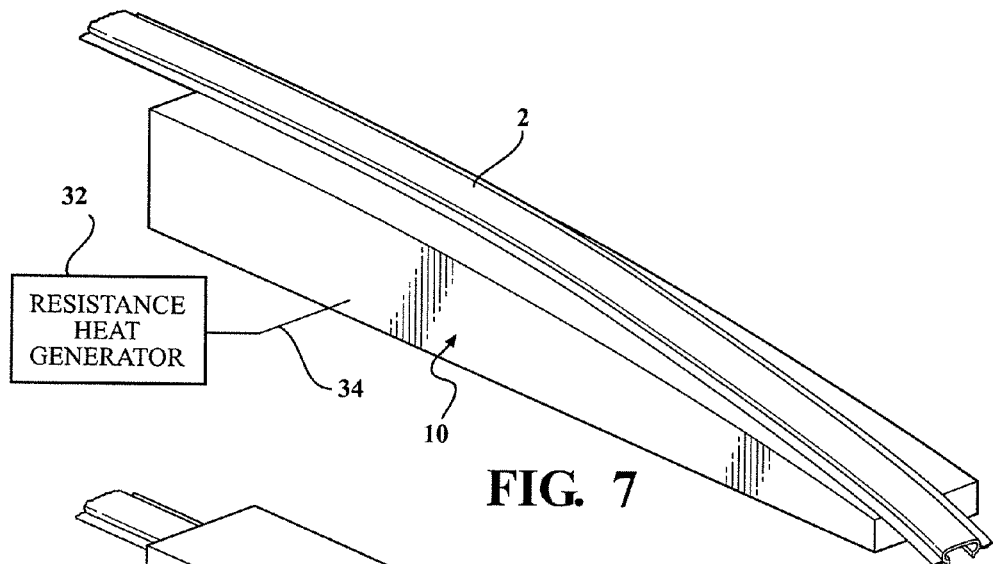
FIG. 7 is an illustration similar to that previously depicted in FIG. 3 and which represents the elongated part supported on the heated fixture for a period of time necessary to heat and reshape to the desired configuration.

FIG. 7 is a perspective illustration of the fixture 10 similar to as previously shown in FIG. 3 with the article 2 supported upon the upper profile surface and in which an thermal input (such as electrically resistant generated) is applied or otherwise communicated to the fixture (see further input source as representatively identified at 32 and communicated by a representative line 34 in order to heat the fixture block and resulting upper surfaces upon which the article 2 is supported).

Figure 8:
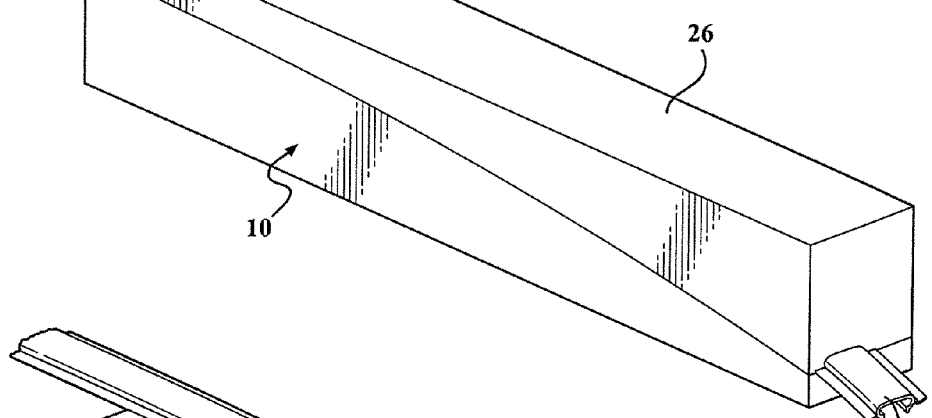
FIG. 8 illustrates the provision of the heated top cap or fixture, such as previously depicted in FIG. 5, and which is assembled over the main fixture.

FIG. 8 is an illustration of the fixture 10 and supported article 2 and further showing either the same top cap or fixture 26 shown in FIG. 5, or alternately a variation of the top cap, arranged in place atop the fixture in order to assist in conforming the heated article into its final shape. Without limitation, the heating step can be performed by a heated main (defined as lower supporting) fixture 10 alone (as again shown in FIG. 9 which is similar to the variation previously depicted in FIG. 3), with an unheated version an upper block 26, or with a likewise heated upper block in place as shown.

Non-limiting variants of the invention contemplate the ability to provide a heating profile at any desired temperature, up to several hundred degrees Fahrenheit in order to provide suitable softening of the fixture channel supporting portion of the article 2. A separate downwardly directed heated profile can again be provided by an upper attached block or cap (again as previously depicted in non-limiting fashion at 26 in FIG. 8) at any temperature not limited to any set range, however often in practicality including a lower delivery temperature which prevents marring of an upper decorative exposed surface of the article being re-shaped.

Additional variants can envision a highly conductive covering material (such as again metal) which can extend over the article 2 and which can assist in providing the necessary heating and reshaping of the roof ditch. The highly conductive covering material can further be integrated or releasably fitted into the opposing locations of the main 10 and upper 26 fixtures.

Figure 9:
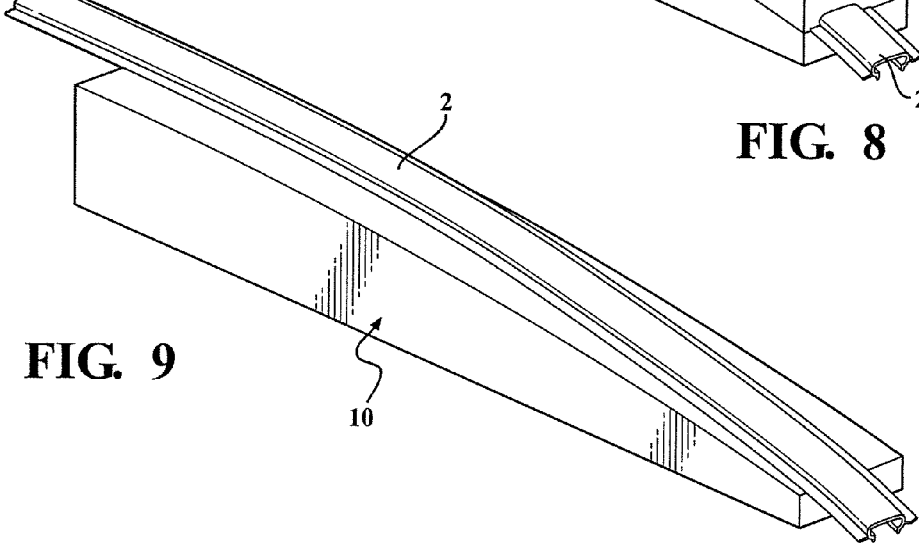
Figure 10:
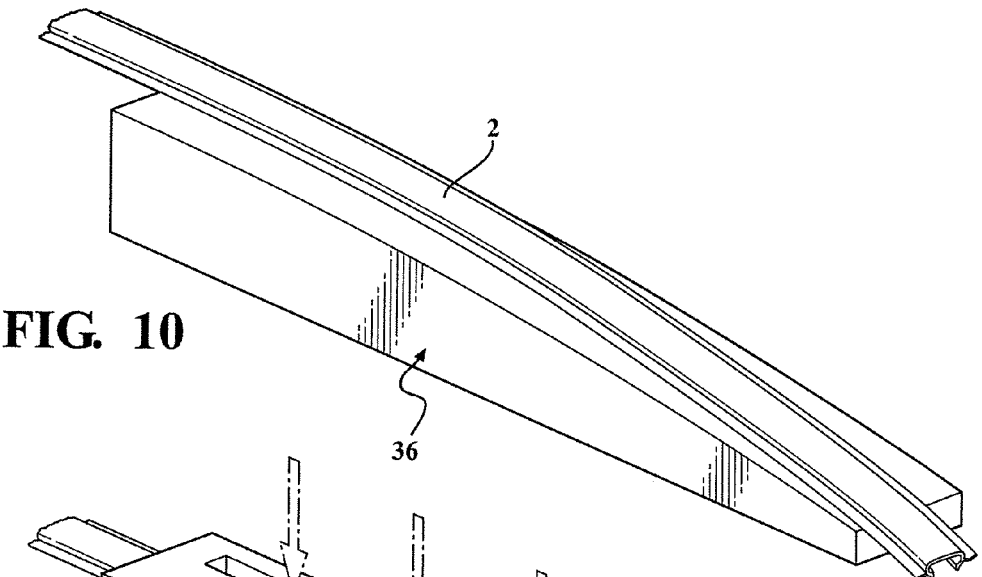
FIG. 10 is an illustration of a cooling step succeeding the heating step in FIG. 9, and in which the part is transferred to a cooling fixture including mating top and bottom halves, such as which can be chilled or provided at ambient temperature to facilitate cooling and hardening of the part in the desired final shape.

FIG. 10 is an illustration of a cooling step succeeding the heating step in FIG. 9, and in which the (now reshaped yet still soft) part 2 is transferred to a corresponding cooling fixture, see generally at 36, such as which is also provided as a metal such as a cold aluminum or like thermally conducting material and which can be chilled or provided at ambient temperature. The purpose of the cooling fixture 36 is to quickly cool and adhere the part 2 (such again following any "spring back" or inherent response of its material to the cooling of the part) in its reshaped state and which is facilitated by the fixture 36 exhibiting a roughly similar surface profile as previously shown by upper arcuate surface 14 and configured projecting surfaces 15/16/17 associated with its article locating and retaining profile, and for further facilitation gripping the underside channel of the article 2. Without limitation, the previously heated and reshaped part 2 can be manually transferred to the cooling block, as well as transferred through the use of appropriate robotic grippers incorporated into a suitably configured automated transfer station defining a component of the assembly.

Figure 11:
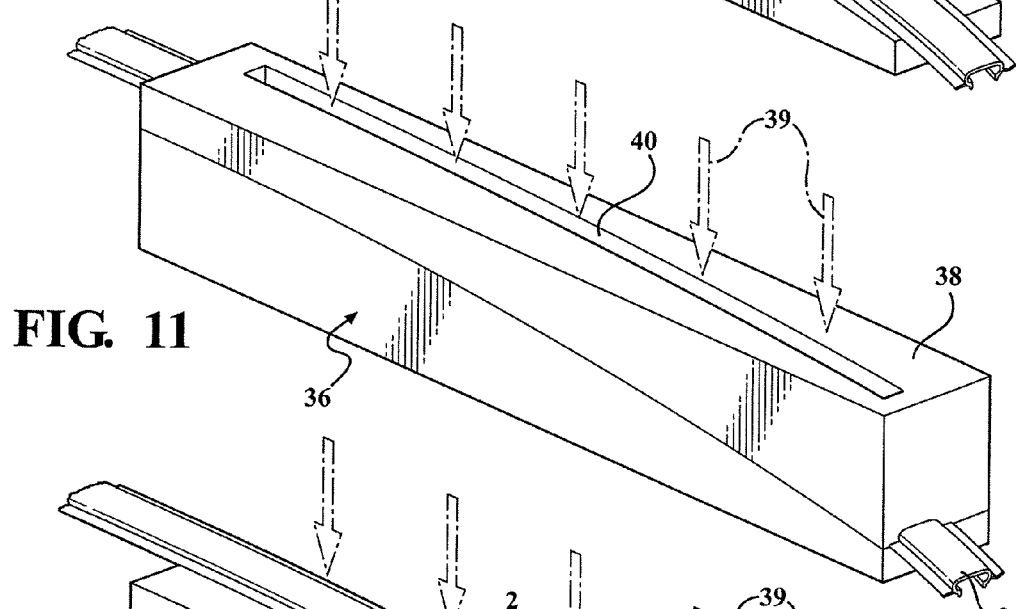
FIG. 11 is an illustration of a variant of the cooling step utilizing the fixture of FIG. 10, and in which an ambient or cold air is delivered downward through a linear slot or channel defined in a top cap or fixture and into contact with the pre-extruded and subsequently bent/reconfigured article.

Proceeding to FIG. 11, an illustration is provided of a variant of the cooling step utilizing the fixture 36 of FIG. 10, and in which a cooling top cap or fixture 38 is provided, such similar to as previously shown at 26, and which is applied over the base cooling fixture 36 with the cooling article 2 sandwiched there between. An ambient or cold air (see arrows 39) is delivered downward through a linear slot or channel 40 defined through the upper surface of the top cap (or fixture) 38, and so that the cooled airflow is directed downward into contact with the pre-extruded and subsequently bent/reconfigured article 2 in order to facilitate/expedite the cooling and solidification of the article into its final shape.

Figure 12:
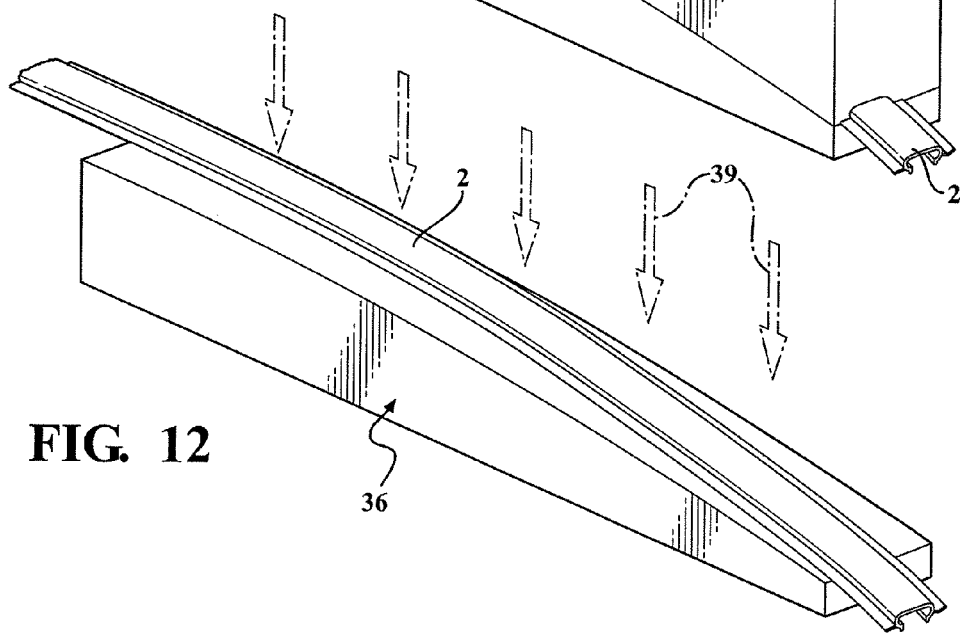
FIG. 12 is a similar cooling step with ambient or cold air is delivered directly upon the exposed article and fixture of FIG. 10 into contact with the pre-extruded and subsequently bent/reconfigured article.
Figure 13:
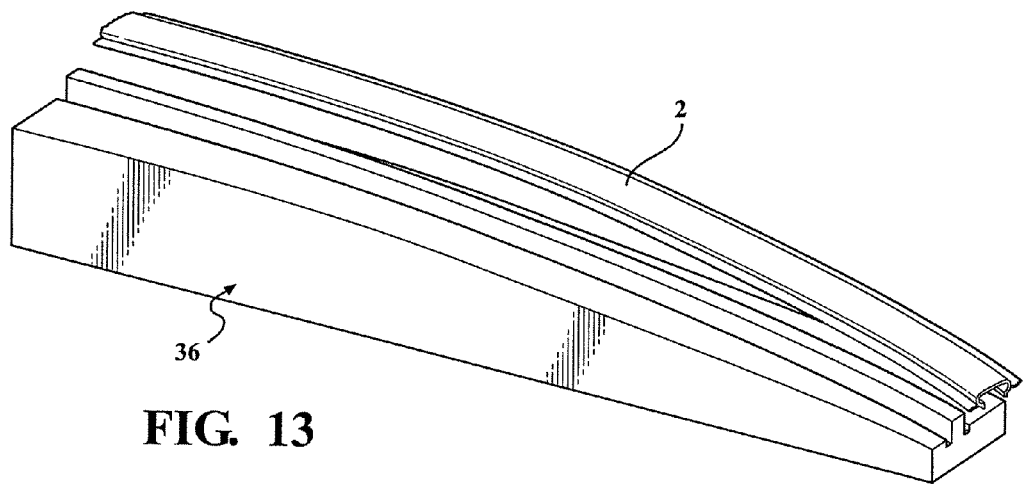
FIG. 13 is an illustration of the finished/bent part removed from the fixture.

FIG. 12 is a similar cooling step with ambient or cold air 39 delivered directly upon the exposed article (without the provision of the top cooling cap 38) onto the exposed upper surfaces of the fixture 36 of FIG. 10, and into contact with the pre-extruded and subsequently bent/reconfigured article in its cooled state. FIG. 13 is an exploded illustration of the multi-dimensionally finished/bent part or elongated article 2 removed from the fixture.

Figure 14:
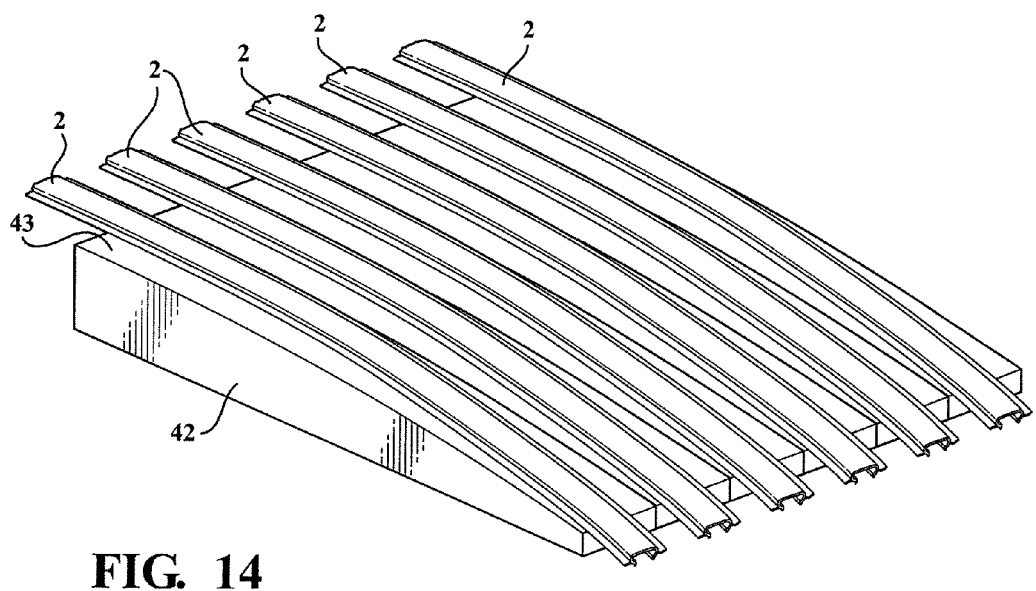
FIG. 14 is an illustration of a modified fixture, such as for use with either or both the heating or cooling cycles, and in which multiple elongated plasticized articles can be reshaped in a single operation, such further permitting the implementation of longer respective heating and cooling cycles.

Proceeding to FIG. 14, an illustration is provided of a modified fixture 42, such as for use with either or both the heating or cooling cycles, and in which multiple elongated plasticized articles 2 can be reshaped in a single operation. This can be assisted by the configuration of multiple supporting locations upon the upper arcuate surface 43 of the fixture 42, each similar in cross sectional shape and length extending fashion to that depicted by interconnected surfaces 15/16/17 in FIGS. 1-2. The utilization of multiple article supporting (and individual heating and cooling) fixtures, such as again at first and second end supporting locations, permits the implementation of longer respective heating and cooling cycles than would be often be possible with the production requirements necessitated in the instance of individual part supporting fixtures, and such as previously depicted at 10 and 36.

Figure 15:
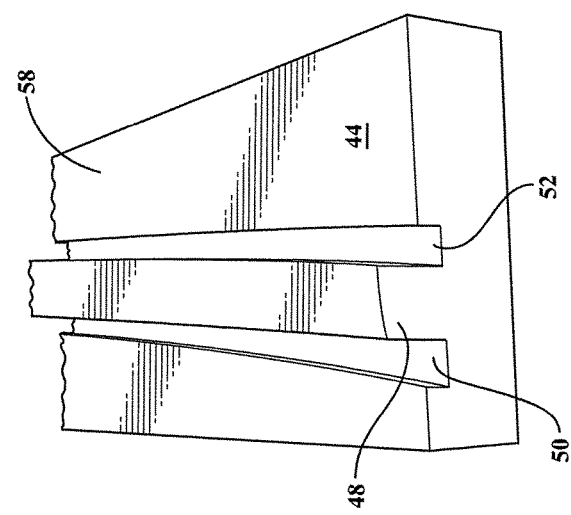
FIG. 15 is an operational illustration of a further non-limiting example of top and bottom heating fixtures incorporated into a reshaping operation associated with the present invention.
Figure 16:
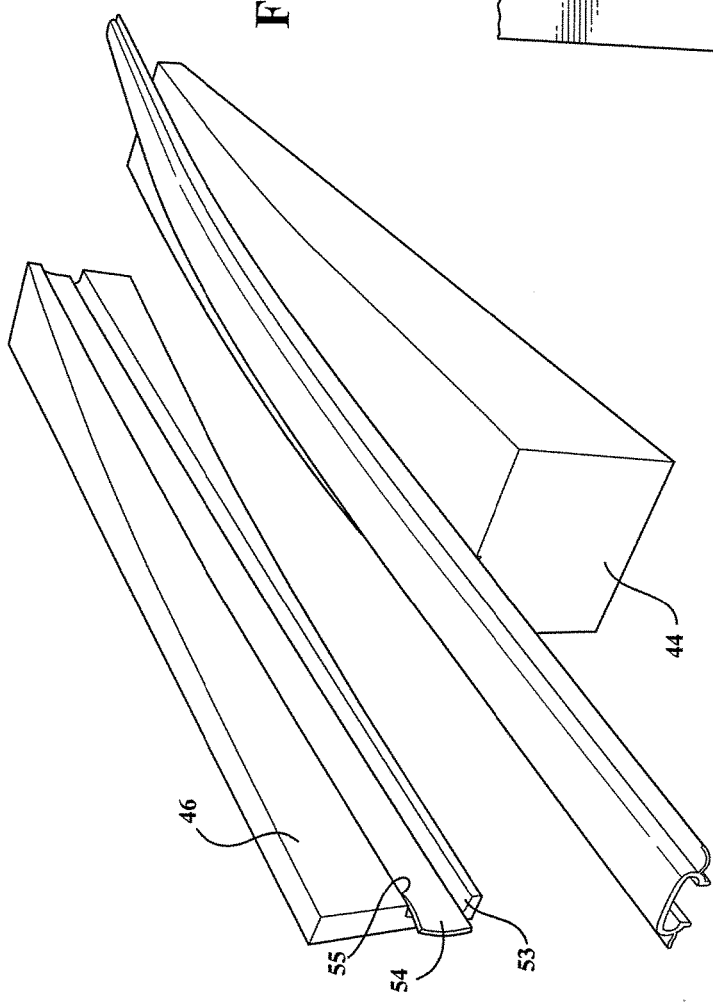
FIG. 16 is an end perspective of the bottom fixture of FIG. 15, with elongated article removed, and better illustrating the features of the surface configured support profile for seating the elongated plastic article via its open cavity defining underside, such as is typical of a roof ditch extrusion molding which exhibits an arcuate extending profile along three dimensions.

Proceeding to FIG. 15, an operational illustration is depicted of a first non-limiting example of bottom 44 and top 46 heating fixtures incorporated into a reshaping operation associated with the present invention. As further shown in FIG. 16, which depicts an end perspective of the bottom fixture 44 of FIG. 15 with elongated article 2 removed, the lower fixture 44 includes a rectangular projection 48 (similar to projection defined by interconnecting surfaces 15/16/17) which is situated between and associated with opposite edge defined channels or troughs (bottom recessed surfaces 50 and 52), this in order to again grip and seat the underside (such as "C" channel) profile of a pre-formed, typically extruded, article 2.

The top cap or fixture 46 can also provide a mating recess or cavity profile, see as further shown by interconnecting surfaces 53, 54 and 55 in FIG. 15 which are associated with a top compressing guide support for the article 2. As previously described, the assembled top and bottom fixtures seat therebetween the elongated plastic article 2 (i.e. by the lower rectangular projection 48 seating within an underside rectangular cavity exhibited by the recessed surfaces 53/54/55 associated with the top cap 44 and in a manner consistent with that previously described. As further shown, the fixtures can be constructed of aluminum or other highly conductive material, such also envisioning the construction of a suitable top and/or bottom fixture exhibiting a cheap stock material, with a highly conductive core associated with the profile configuring surfaces of the article.

FIG. 17 is a further illustration in perspective of the top and bottom fixtures of FIG. 15 taken from an opposite end and better illustrating the manner in which the arcuate opposing surfaces, including upper surface 56 for lower fixture 44 and downwardly facing surface 58 for assembleable upper or top cap fixture 46) vary in thickness between their opposite linear ends. This in combination with the profiled and cavity defining surfaces established between the bottom and top assembleable fixtures provides for the multi-axial configuration of the reshaped elongated article 2, reference also being made to FIG. 19 which depicts an opposite and thinnest end perspective of the base fixture 44. Also depicted are plural bunches of wires 59 extending to reverse side locations of the lower heating fixture 44 and representing one variant for resistively heating the fixture to assist in a thermoplastic reforming of the elongated plasticized article supported thereupon.

Figure 19:
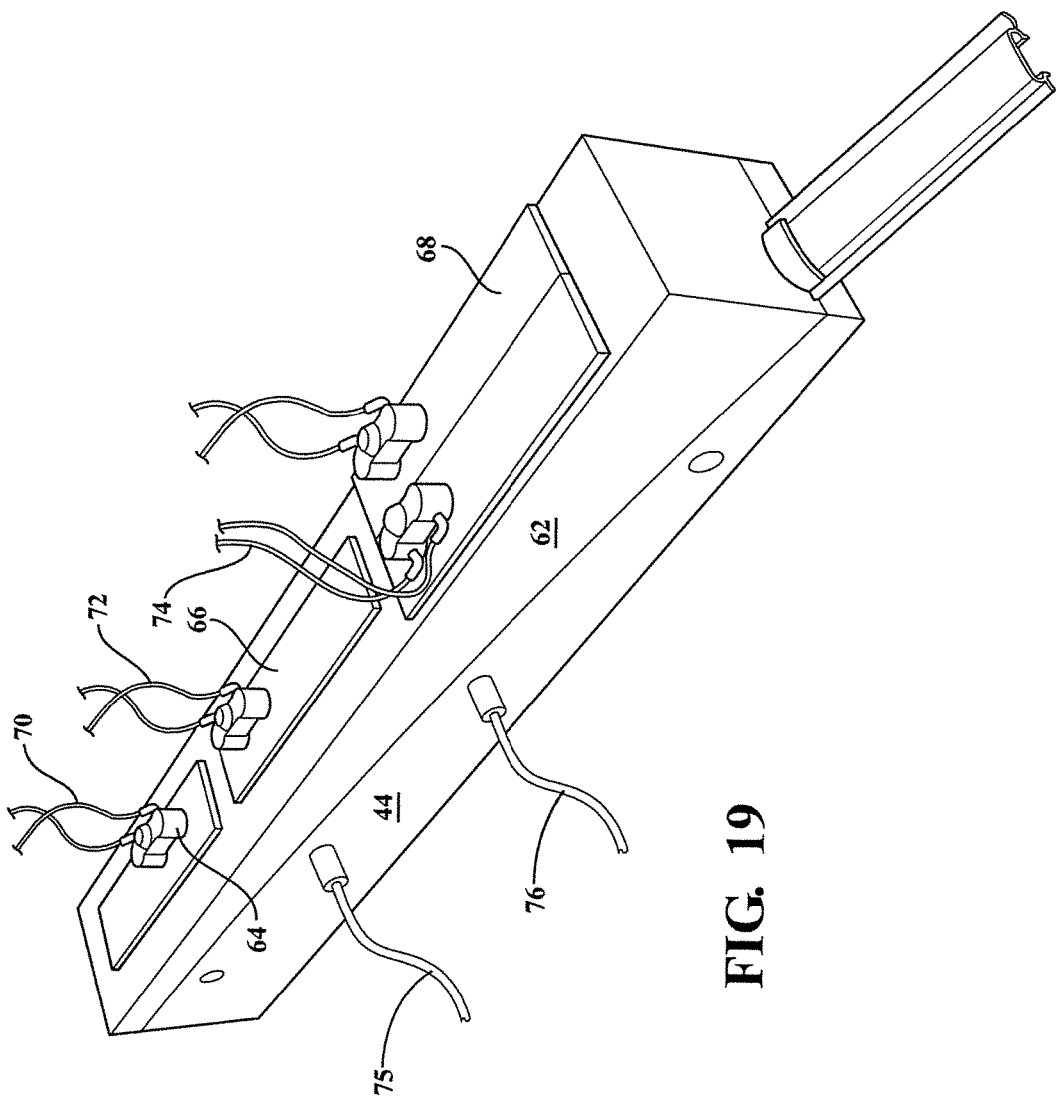
FIG. 19 is an illustration of a heated top fixture in combination with the bottom fixture of FIG. 18, and with the elongate extruded article prepositioned upon the bottom fixture and which further illustrates one non-limiting arrangement of couplings and conduits associated with the top and bottom assembled fixtures for facilitating heated reshaping of the previously extruded article.

FIG. 19 is an illustration of a variant of a heated top fixture, at 62, according to a further non-limiting variant, in combination with the bottom fixture 44 of FIG. 17 and with the elongate extruded article 2 prepositioned upon the bottom fixture in order to be constrained along with the assembleable top fixture into its desired final configuration. A non-limiting arrangement of couplings 64, 66, 68, et. seq. and conduits 70, 72, 74, et seq. are associated with either or both of the top and bottom assembled fixtures for providing a desired heated profile to the fixtures 44/62, facilitating heated reshaping of the previously extruded article 2 sandwiched there between. Additional heating inputs are depicted at 75 and 76 in phantom and broken-away fashion connecting to side locations of the lower fixture 44 and which can be provided in any configuration for establishing a desired heating profile for assisting in reshaping and setting the originally straight elongated (typically extruded) article in a desired multi-axial pattern or configuration associated with the fixture support locations.

FIG. 18 is an illustration of a similarly configured cooling block or fixture, see at 77, such as which approximates the surface configured profile of the main heating fixture 44 (consistent with that previously described) and to which the elongated part can be transferred during a subsequent cooling/setting stage. As previously described, the cooling template (as well as possibly a corresponding upper or top fixture) is typically provided of an ambient or chilled metal (so as to enhance a cooling thermal profile delivered to the surfaces of the cooling article during its solidifying and spring-back process), it further being understood that the cooling fixture(s) are capable of being constructed of any material which provides for sufficient heating and cooling profiles applied to the reshaped articles or extrusions. As with the lower fixture 44, a top arcuate surface 78 (corresponding to that at 56 in FIG. 17), as well as an upper rectangular cross sectional projection 79 (further corresponding to that at 48) are configured into the chilling/cooling block 77 to facilitate cooling and setting of the finally re-shaped article 2 as dictated by any variances in the shaping of the contours of the heated fixtures 44 and 46 which are designed to ensure that the finally reshapened and cooled plastic part springs back to the desired final multi-dimensional profile which is typical of the geometry of the cooling fixture support surface.

Figure 20:
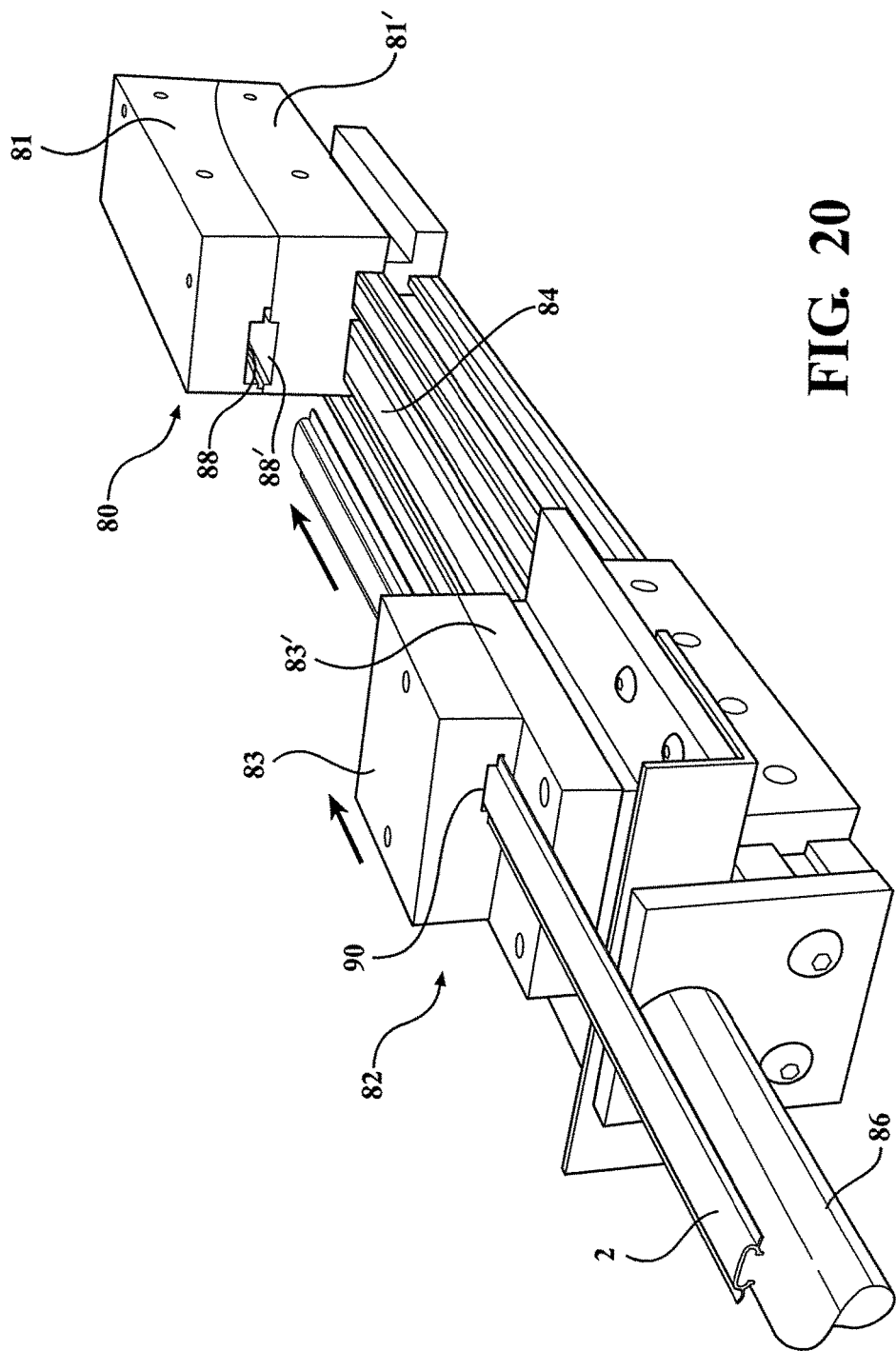
FIG. 20 is a first perspective illustration of a reshaping assembly according to a further variant and including a combination of first fixed and second slidable jigs or fixtures arranged upon a track, the slidable fixture being bi-directionally displaceable upon a linear actuating ram and in order to both initially feed either a pre-heated or post heated elongate plasticized article, as well as subsequently tension (further defined as both stretching and multi-dimensionally reshaping) the elongated plasticized article into is final configuration.

Proceeding to FIG. 20, a first perspective illustration is depicted of a reshaping assembly according to a further variant of the present inventions and which includes both fixed 80 and slidable 82 jigs or fixtures, the slidable fixture being bi-directionally displaceable upon a track 84 and by a linear actuating ram 86 and in order to feed either a pre-heated or post heated elongate plasticized article (not shown) to the fixed jig 80 secured to an end of the track 84. As further depicted along with each of succeeding FIGS. 21-23, the fixed jig 80 can include upper 81 and lower 81' assembleable halves, each of which including an inner mating recess profile 88 and 88', respectively, assembly of which defines an inlet cavity or profile for receiving an associated end extending length of the article 2.

The track supported and slidable jig 82 can also be constructed of assemble-able halves 83 and 83' (both the jigs/fixtures 80 and 82 including mounting bolts, quick release fasteners or other mounting structure for quickly assembling and disassembling the fixtures so that the article is supported or grasped in extending fashion therebetween in a linearly aligned and opposing receiving cavity or slot established by a corresponding pair of mating recess profiles 90 and 90' (see as best shown in rotated perspective of FIG. 23) associated with the assembled portions or halves 83 and 83' of the slidable jig. In this fashion, and upon pre-loading for fastening a first extending portion of the article to the slidable jig 82 (and through the aligning cavity established between mating recess profiles 90 and 90'), an opposite end of the article 2 is pre-locating within an inlet location of the cavity defined by the mating recess profiles 88 and 88' defined in the fixed jig 80.

At this point, the slidable jig is 82 is displaced by the ram 86 forwardly in a direction towards the fixed jig 80 (FIG. 21) so that the article 2 is forcibly fed through the cavity established between sandwiching support surfaces 88 and 88' and as further depicted by arrow 92 and which can be according to any profile defining and/or multi-axial curvature associated with the article support contours of the cavity established by the support surfaces of the fixed jig 80.

As with previously described variants, the article can be pre-heated at an initial station (not shown) prior to being mounted to the fixed and slidable jigs, these likewise also being optionally heated during the conforming and reshaping process. Without limitation, the upper 81 and lower 81' halves can be brought together in any manner desired and such as including, but not limited to, providing side or end supported brackets for pivotally opening or closing the halves of the fixed jig. A track and guide mechanism could also be envisioned which facilitates the ability to linearly open and close the upper half 81 from the lower half 81'. Alternately it is envisioned that clamps, fasteners or the like can be utilized for affixing the upper and lower halves 81/81' during the loading and stretching/reforming operations.

Figure 21:
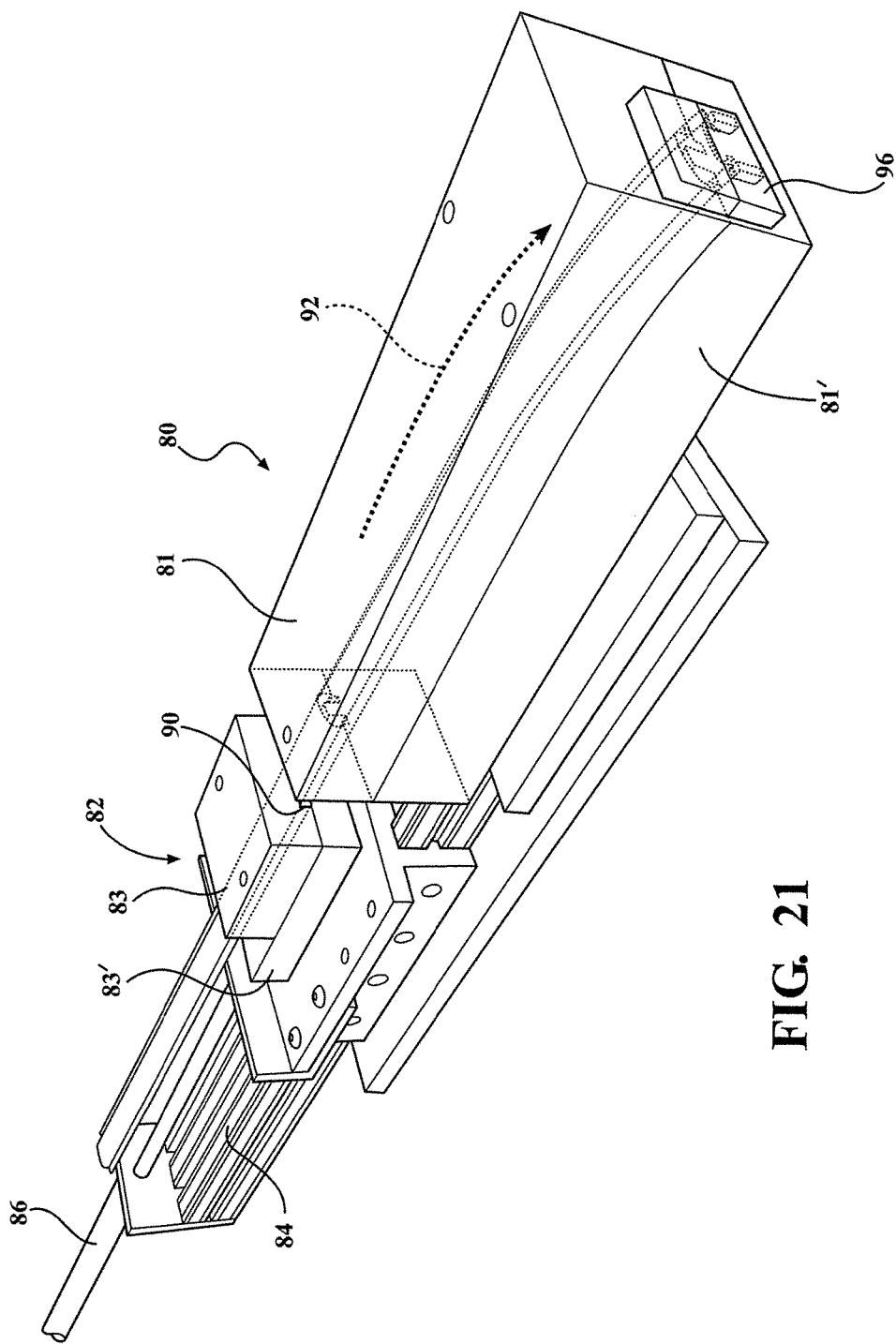
FIG. 21 is a reverse end perspective of the assembly shown in FIG. 20 with the slidable fixture in a first position relative to the fixed fixture.
Figure 22:
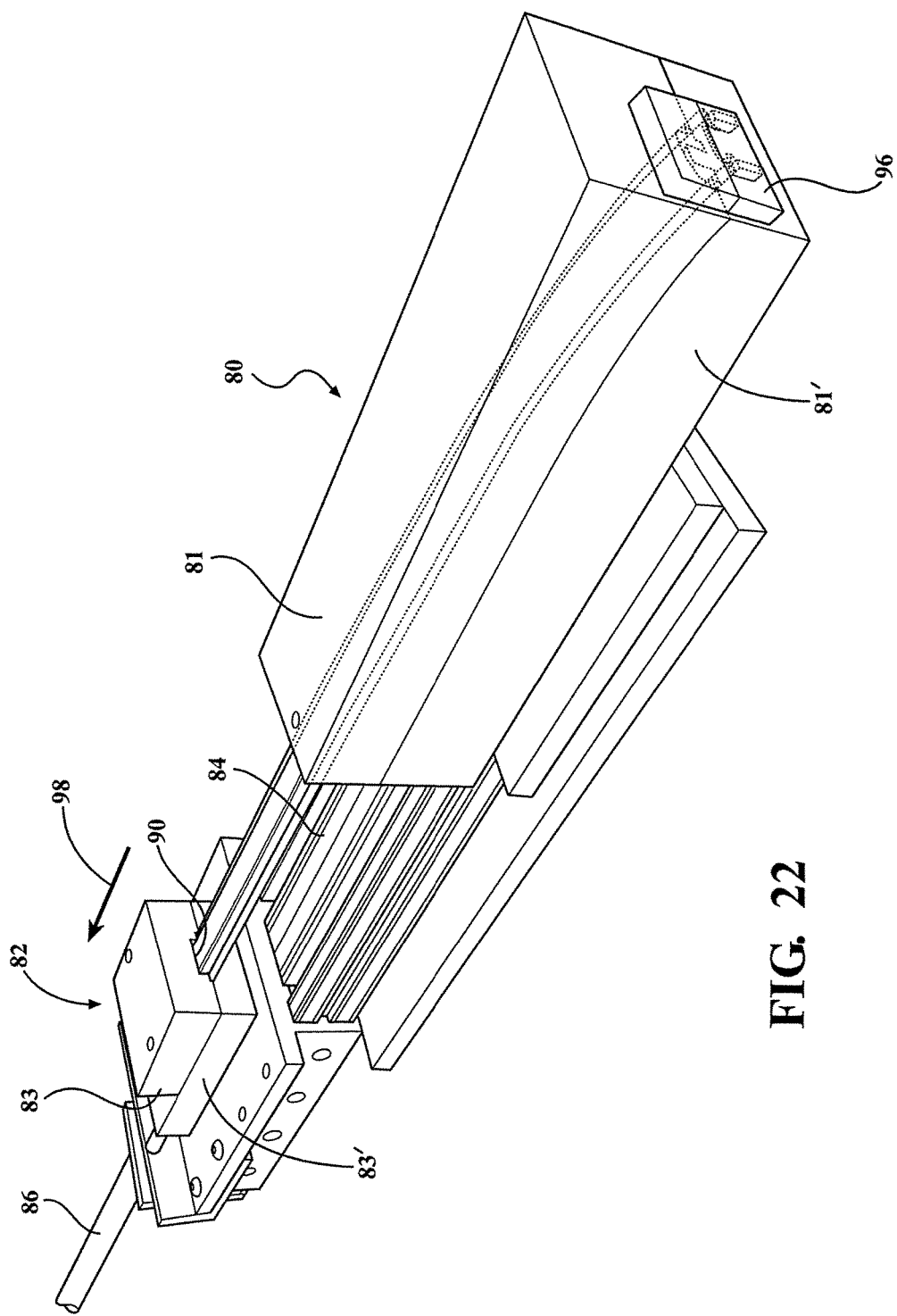
FIG. 22 is further end perspective similar to FIG. 21 and such as which can include a clamp or suitable gripper for engaging a projecting tip of the article, further such as preceding a reverse actuation of the sliding fixture in the position shown and in order to draw down (again defined as stretch and reshape) the elongated article against the surface profile to assist in bending or locking in the desired profile.

It is also envisioned that a clamp or suitable gripper, see at 96, can be configured with the outermost end of the fixed jig 80, such being either positioned internally at a location within the fixture for grabbing the article 2 upon the slidable jig 82 traversing inwardly or, as depicted, at an outermost location for capturing an end most displaced portion of the article 2 as directed by arrow 92 in the part loading step of FIG. 21. As shown, the clamp 96 is configured with any spring back engagement features in order to intercept a portion of the article 2 which may be displaced rearwardly of the fixture 80 by extending the aperture 88/88' defined support cavity through the back end of the fixture 80, and in combination with the inward displacement of the sliding jig 82 as shown in FIG. 21. In this arrangement, the grasping structure can be designed for engaging a projecting tip of the article (not shown), such as preceding a reverse actuation of the sliding fixture 82 (arrow 98 in FIG. 22), and in order to tension (or draw down) the article against the multi-axial surface profile 88/88' to assist in bending or locking the article in that desired profile.

Figure 23:
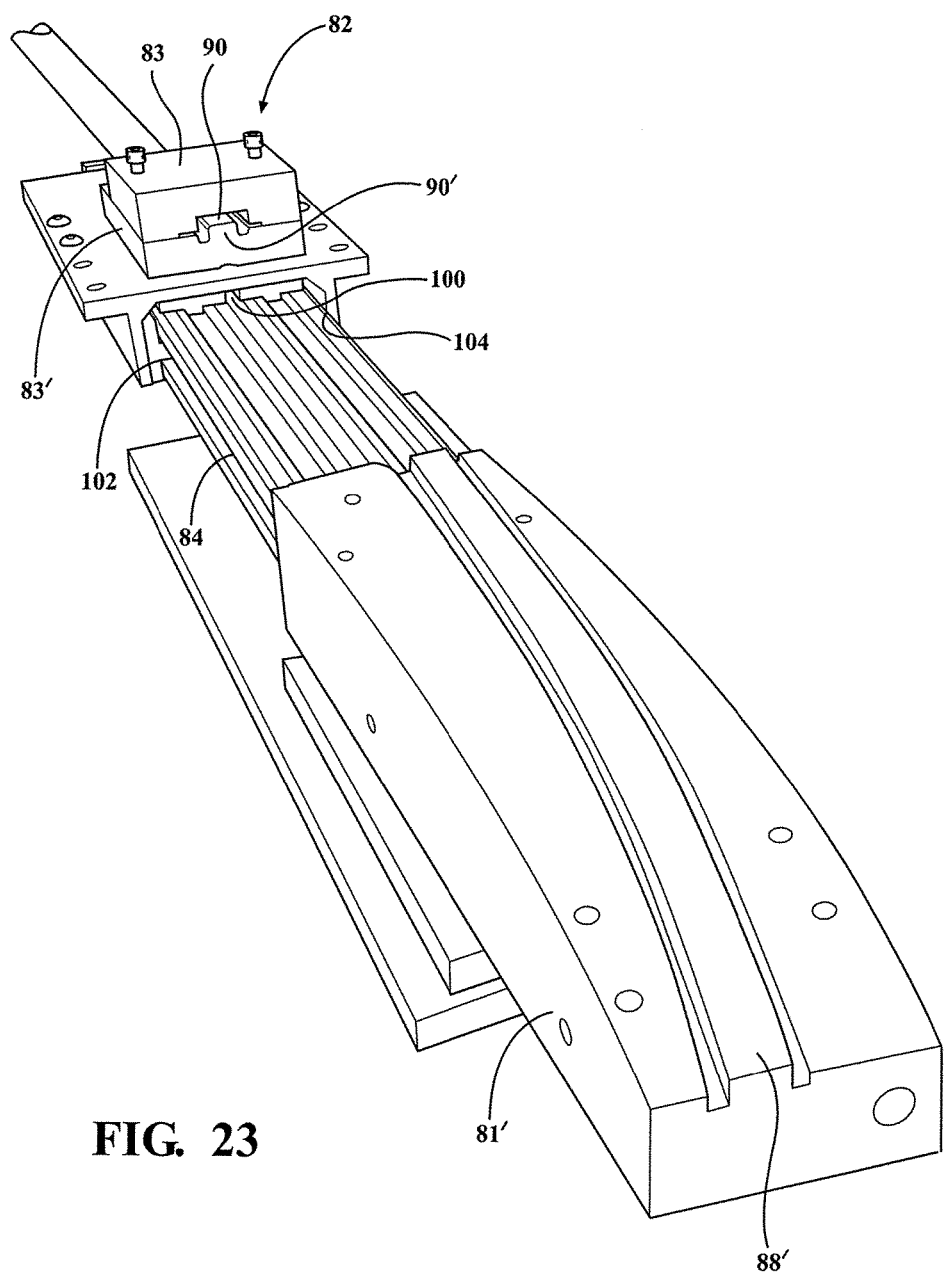
FIG. 23 is a further rotated end perspective of the assembly of FIG. 20, with the upper mating half of the fixed jig removed, and best illustrating the multi-dimensional contouring of the article receiving profile.

To this end, FIG. 23 illustrates a further rotated end perspective of the assembly of FIG. 20, with the upper mating half of the fixed jig removed, and best illustrating the multi-dimensional contouring of the article receiving profile. This again includes the lower mold half 81' with the part support track or recess profile 88' shown in a multi-dimensional sloping fashion. Also best shown in FIG. 23 is the multi-surface sliding support arrangement established between three interconnecting underside surfaces of the sliding jig 80 (see at 100, 102 and 104) for providing secure and non-tilting displacement of the sliding jig 82 along the track 84.

The construction of the assembly of FIGS. 20-23 envisions, in one application, the ability to three dimensionally form a single end of an elongated article exhibiting a generally linear intermediate location. It is envisioned that a further assembly of similar to identical construction can be provided to similarly form a reverse extending end of the elongated article 2 following the initial formation process of FIGS. 20-22.

Additional embodiments could potentially envision a further modified assembly which could include the slidable jig displaceably supported between a pair of fixed end jigs and which could secure a midpoint location of the article 2 for concurrent and three dimensional tensile bending formation of the final shaped article. Although not shown, this could further envision a pair of opposite end situated fixed jig subassemblies each including clamp and release structure to facilitate alternate and successive tensile forming (or drawing down) of the part upon the heated multi-dimensional template surfaces, such occurring without having to dismount a selected end of the article from either of the fixed jigs.

Although not shown, it is also envisioned that the track 84 (shown as a linear extending article in the fixture variant of FIGS. 20-23) can likewise be redesigned to exhibit and arcuate or sloping profile similar with the several other variants illustrated herein. In this fashion, the stretching of the article caused by the extension of the slidable jig (FIG. 22) in order to draw the heated end of the article 2 along the sloping support surface (88' of FIG. 23) can further be complemented by additional arcing of the slidable jig 82 along a reverse sloping face of redesigned track 84.

Without limitation, additional trimming and sectioning steps can be incorporated in which an excess determined end length of the fully reshaped article is clipped or sectioned, this also taking into account dimensional errors which may occur during the heating, bending, stretching or cooling steps applied during reforming into the desired multi-axial configuration and which are avoided by pre-providing the elongated article or like extruded blanks with extra length which can be clipped or sectioned in order to provide an even finishing and trim appearance. As previously described, on advantageous application of the present system, assembly and process is for the bending of a previously multi-component extruded roof ditch molding, however it is understood that the present inventions are likewise applicable to a number of different applications outside of those disclosed herein.

Having described my invention, other and additional preferred embodiments will become apparent to those skilled in the art to which it pertains, and without deviating from the scope of the appended claims:

We claim:

1. A method for bending a previously formed and elongated thermoplastic article, the article having receiving edges, said method comprising the steps of:
    providing a heating fixture exhibiting at least an upwardly configured and multi-dimensional extending support surface corresponding to a desired multi-dimensional profile associated with a finished and reshaped article;
    configuring first and second troughs in length extending fashion along the support surface;
    applying the elongated article in an initially linear configuration upon the support surface so that the receiving edges of the elongated article are received within the troughs in order to orient the article upon the fixture, forcibly conforming the article from its linear configuration against the multi-dimensional profile of the heating fixture;
    the receiving edges further including inwardly facing and side recess locations, said step of forcibly conforming the article further including grasping the side recess locations which communicate with the receiving edges of the article;
    heating and subsequently softening the article in order to bend it against the multi-dimensional profile; and
    transferring the article to a cooling block exhibiting a further multi-dimensional extending support surface corresponding to that of the heating fixture for completed cooling and solidifying of the article in its desired reshaped profile.

2. The method as described in claim 1, further comprising the step of preheating at least first and second ends of the elongated article prior to applying to the fixture support surface.

3. The method as described in claim 1, said step of forcibly conforming the article further comprising applying an upper mating fixture over the fixture in order to sandwich the article therebetween, the upper mating fixture defining an underside surface which mates with the top surface of the heating fixture to collectively exhibit an underside cavity matching a cross sectional profile of the article.

4. The method as described in claim 1, said step of heating the article further comprising generating a resistive electrical and conductive heat input to the fixture.

5. The method as described in claim 4, said step of cooling the article further comprising introducing a downward cooling airflow through the cooling block and upon an upper surface of the article.

6. The method as described in claim 1, said step of forcibly confirming the article further comprising applying an overhead roller against an upper surface of the article along the length of the heating fixture.

7. The method as described in claim 1, said step of grasping the side recess locations of the article further comprising configuring gripping fingers extending upwardly through the heating fixture in communication with the troughs, the gripping fingers each including opposite and outwardly facing ledge locations for engaging interfaces between the side recess locations and receiving edges of the article underside.

8. A method for bending a previously formed and elongated thermoplastic article, the article having receiving edges, said method comprising the steps of:
    providing a heating fixture exhibiting at least an upwardly configured and multi-dimensional extending support surface corresponding to a desired multi-dimensional profile associated with a finished and reshaped article;
    configuring first and second troughs in length extending fashion along the support surface;
    applying the elongated article in an initially linear configuration upon the support surface so that the receiving edges of the elongated article are received within the troughs in order to orient the article upon the fixture, forcibly conforming the article from its linear configuration against the multi-dimensional profile of the heating fixture;
    said step of forcibly conforming the article further including applying an upper mating fixture over the fixture in order to sandwich the article therebetween, the upper mating fixture defining an underside surface which mates with the top surface of the heating fixture to collectively exhibit an underside cavity matching a cross sectional profile of the article;
    providing the fixture and the upper mating fixture as a first stationary jig;
    providing a track extending from the first jig and slidably supporting a second jig with assembleable upper and lower halves in linearly traversable fashion upon the track;
    clamping an end of the elongated article to a mating cavity defined in the assembleable halves of the second jig; and
    applying a linear driving force to the slidable jig and translating an opposite end of the article through the multi-dimensional extending support surfaces defined in the stationary jig in order bend and forcibly conform the article;
    heating and subsequently softening the article in order to bend it against the multi-dimensional profile; and
    transferring the article to a cooling block exhibiting a further multi-dimensional extending support surface corresponding to that of the heating fixture for completed cooling and solidifying of the article in its desired reshaped profile.

9. The method as described in claim 8, the first stationary jig further including a pair of stationary jigs, further comprising the step of the slidable jig gripping an intermediate location of the article and of bi-directionally driving the second slidable jig for translating the article through multi-dimensional extending support surfaces defined within the pair of stationary jigs located on opposite sides of the slidable jig.

10. The method as described in claim 8, further comprising the step of preheating the elongated article prior to translating through the first stationary jig.

11. The method as described in claim 8, the step of providing a heating fixture further comprising heating the stationary jig to heat and subsequently softening the article in order bend it against the multi-dimensional profile.

12. The method as described in claim 11, further comprising the step of transferring the article to a cooling block exhibiting a further multi-dimensional extending support surface matching that of the heating fixture for completed cooling and solidifying of the article in its desired reshaped profile.

* * * * *